United States Patent
Pershin et al.

[11] 3,844,545
[45] Oct. 29, 1974

[54] SHOCK-ABSORBING ARTICLE AND A METHOD FOR PRODUCING SAME

[76] Inventors: Valentin Andreevich Pershin, ulitsa Ju.Gagarina, 6, kv.74; Evgeny Ivanovich Shpadi, ulitsa Vilonovskaya, 13, kv.24; Gennady Vasilievich Lasutkin, ulitsa Pobedy, III, kv.26; Alexei Dmitrievich Pichugin, prospekt K.Marxa, 185a, kv.36; Vladimir Nikolaevich Trubin, ulitsa Malo Yaroslavskaya, 09, kv.3, all of Kuibyshev, U.S.S.R.

[22] Filed: June 5, 1972

[21] Appl. No.: 259,814

[52] U.S. Cl. ................ 267/147, 267/152, 29/173
[51] Int. Cl. ............................................ F16f 13/00
[58] Field of Search ....... 267/147, 148, 152; 29/173

[56] References Cited
UNITED STATES PATENTS

| | | | |
|---|---|---|---|
| 2,867,434 | 1/1959 | Johnson | 267/152 |
| 3,243,154 | 3/1966 | Dlyden | 267/152 |

FOREIGN PATENTS OR APPLICATIONS

| | | | |
|---|---|---|---|
| 1,440,023 | 12/1965 | France | 267/152 |
| 1,079,736 | 8/1967 | Great Britain | 267/148 |

Primary Examiner—Robert G. Sheridan
Assistant Examiner—Kenneth Noland
Attorney, Agent, or Firm—Holman & Stern

[57] ABSTRACT

Shock-absorbing articles comprising pressed together wire spirals and a wire bunch with the wire spirals laid uniformly in density both in thickness and over an area of the article and with the bunch placed throughout an article area in turns displaced relative to each other and with either of them encompassing successively fastener places.

15 Claims, 9 Drawing Figures

PATENTED OCT 29 1974 3,844,545

SHOCK-ABSORBING ARTICLE AND A METHOD FOR PRODUCING SAME

BACKGROUND OF THE INVENTION

The present invention relates to shock-absorbing articles of non-woven durable material — metal wire, and to methods for their fabrication.

PRIOR ART

Known in the prior art are several procedures for manufacturing shock-absorbing articles utilizing non-woven metal wire material.

One of the most widely used methods for manufacturing these shock-absorbers is that in which article blanks of a specified shape are produced by laying crisscross wire pieces in the form of a spiral in dies, corresponding in shape and size to the finished article, and forcing them together by applying pressure.

An original element for the production of the above articles of the non-woven material is a wire spiral wound by using one or another procedure to lay one turn after another.

However, peculiar to the shock-absorbing articles manufactured by the above procedure, are low static strength and damping capacity since they lack elements capable of absorbing elevated mechanical loads and raising the damping capacity of the article.

Frequently the aforesaid drawbacks prevent wire spirals from being utilized as elastic members (springs) in shock-absorbing and damping systems operating under excessive vibration, shock and linear overloads.

Also known is a method of producing blanks for shock-absorbing articles made of helical wire portions wound on a pre-fabricated wire bunch in a direction opposite to that in which the bunch proper was stranded and with a pitch equal to a spiral diameter (see, for example, the Author's Certificate N 269913, C1.7d16 issued in the USSR).

However, even the shock-absorbing articles fabricated by the above procedure are characterized by inadequate damping and strength properties which result from random location of the bunch in the blank.

OBJECTS AND SUMMARY OF THE INVENTION

It is an object of the present invention to eliminate the above drawbacks.

The present invention is directed to in essence developing novel shock-absorbing articles and a method for their production, which (the articles) are easily fabricated and in which a wire bunch is arranged so as to raise appreciably both the static strength and shock-absorbing capacity of the articles.

The specified object is achieved in a shock-absorbing article made up of forced together wire spirals and a wire bunch in which, according to this invention, the wire spirals are laid to provide an article uniform in density both in thickness and over its area with the bunch placed uniformly throughout the area of the article in turns which ar displaced relative to each other and either of which encompasses in succession the portion designed for receiving fasteners.

When a ring-type article is produced, it is desirable that the bunch shall be laid in the form of an Archimedean spiral.

In the event a bell-shaped article with a central bore for a fastener is produced, it is expedient to lay the bunch turns in such a manner that they are uniformly distributed over the entire area of the article in a space between a fastener hole and an article edge with each turn approximating in shape to an isoceles triangle whose sides are disposed radially, with a vertex encompassing the fastener hole and a base positioned on the external edge of the article.

Thus, the wire bunch being arranged in turns which are displaced in relation to each other and pass in succession around the fastener hole tends to raise appreciably both the damping capacity and static strength of the articles in tension, compression and shear, and the bunch is adequately resilient to damp an amplitude of vibrations of vibration-or/and shock-insulated items.

In the method of producing ring-type articles by pressing the blank made up of the wire spirals and the bunch, it is sound practice to set the wire bunch along the exterior of the wire spiral blank which is then coiled and pressed in dies similar in shape to that of the article being manufactured with a compression force directed along a coil axis and the bunch laid in the form of the Archimedean spiral during the pressing operation.

In the method for producing bell-shaped articles, it is expedient, prior to pressing together the wire bunch and the blank made from the wire spirals, to place the bunch in turns onto a fixture comprising a central rod located in its central portion and equally circumferentially-spaced pins disposed at its periphery and spaced radially from the rod. The stock or blank produced is removed from the fixture and laid on the wire spiral blank to be pressed together. In laying the bunch, each turn shall pass around the rod and several pins with each subsequent turn being displaced in relation to the preceding turn and the turns approximating in shape to isoceles triangles whose sides are disposed radially, with the vertices encompassing the central rod and the bases located along the external edges of the article encompassing several pins.

To raise both the static strength and damping capacity of the article, it is also expedient before setting the bunch onto the blank surface, to wind it with the wire spiral or simply with the wire having helical portions.

In winding the bunch with the wire spiral, it is sound practice to apply a requisite tension and to execute winding with a pitch equal to a diameter of the wire spiral; in winding the bunch with the wire comprising helical portions, a pitch shall be equal to 5–8 wire diameters.

In order to increase article spring (elasticity), good practice is to lay the bunch wound with the wire spiral or with the wire comprising helical portions in the form of a zigzag.

The shock-absorbing articles, proposed herein, with wire spirals and bunches produced of any wire grade, especially of corrosion-resisting alloyed steels, are suitable for operation in a wide range of temperatures (−50°C+250°C), under various environmental conditions: relative humidity of up to 98 percent, at +40°C temperature, when exposed to radiation, sea fog, in vacuum, aggressive environment and stocked out in storage for an unrestricted period of time. The articles manufactured of non-magnetic wire spirals and bunches can be used to protect magnetic-susceptible apparatus from vibrations and shocks under similar climatic and radiation conditions.

Th nature of the present invention will become more fully apparent from a consideration of the following examplary embodiments of the shock-absorbing articles and methods for carrying them into production taken in conjunction with the accompanying drawings, in which:

DETAILED DESCRIPTION OF THE INVENTION

Figure 1:
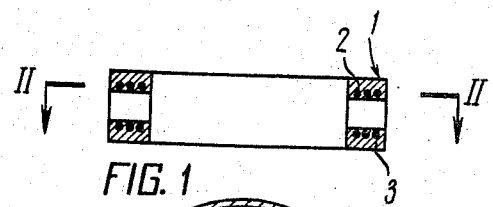
FIG. 1 is a diametrical sectional view of a ring-type article according to the invention.

Elements used in producing the shock-absorbing articles consists of a wire bunch and a wire spiral wrapped densely one turn after another. As to a wire grade employed and its diameter, they depend on designation, operating conditions and dimensions of the articles produced (humidity, temperature ranges, magnetic properties, lifting capacity, etc.).

Elevated static strength and higher damping properties are assured by the number of threads and wire diameter employed for producing the bunch as well as by the pitch and tension of the wire spiral or wire thread with helical portions intended for winding the bunch.

In addition, when winding the bunch with the wire spiral, the pitch shall be equal to a diameter of the wire spiral, while winding with the wire comprising helical portions shall be accomplished with a pitch amounting to 5–8 wire diameters.

Higher elasticity can be obtained with the bunch laid upon being wound in the form of a zigzag.

In manufacturing a shock-absorbing article, a requisite amount of the wire spiral shall be weighed and bunch length measured accurate to 1 percent which will provide stable amplitude-frequency characteristics of the articles.

By using the above method, blanks of two types can be produced.

TYPE I

A wire spiral is expanded to a pitch equalling a spiral diameter whereupon the spiral is laid in the form of a flat blank uniform in density both in thickness and over its area. In forming wire spirals into blanks each of them is simultaneously fitted with a wire bunch. The latter is uniformly placed along a surface of the wire spiral blanks which are then coiled and pressed in dies having a shape similar to that of the article to be produced with a pressing force directed along a coil axis and the bunch laid up during the pressing operation in the form of an Archimedean spiral.

TYPE II

The blanks of wire spirals and those of a wire bunch are fabricated separately to be assembled for obtaining a single lay-out.

The process of manufacturing the blanks of the second type consists in the following steps:

the wire spiral is expanded to obtain a pitch amounting to a spiral diameter whereupon the blank is formed by the foregoing method. The number of such blanks produced of the helical wire depends on parameters and designation of the article. The blanks produced thereof can be preliminarily subjected to cold forming.

The next step involves the fabrication of the blanks of the wire bunch wound with the wire spiral or with a thread having helical portions. The bunch can be shaped into a zigzag.

In making a blank of the wire bunch, the latter is laid in turns with each of them being displaced relative to the other; the turns are uniformly distributed throughout the blank area with either turn approximating in shape an isosceles triangle and passing successively around the location for a future fastener hole.

On being set in the above manner, the bunch can be preliminarily pressed.

The blank manufactured of the wire spirals is arranged together with those of the wire bunches.

Both arrangements of the first and the second type are wound with the wire spiral and cold formed to a specified diameter.

Set forth below is the description of two examples illustrating the process of fabrication of the shock-absorbing articles.

EXAMPLE 1

Manufacturing a ring-type shock-absorber

A wire spiral of a requisite weight, expanded to a pitch equalling a spiral diameter is laid in any manner to produce a mat uniform in density both in thickness and over its area. Laid along the surface of the blank is a bunch which may be set either in a single thread or in turns so that each turn shall be laid lengthwise, the blank, passing around the places for fastener holes. Next, the mat produced is coiled and compressed to a preset size in a die made in the form of the article being manufactured with a compressing force directed along a coil axis. Thus, a ring-type shock-absorber 1 (FIG. 1) is produced.

Figure 2:
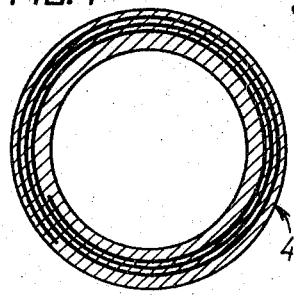
FIG. 2 is a section on line II—II of FIG. 1, the view being on an enlarged scale.

In such an absorber, a wire bunch 2 is compressed into a wire spiral 3 being laid in the form of an Archimedean spiral 4 (FIG. 2).

The bunch 2 laid in the above manner tends to increase substantially both the static strength and damping capacity of shock-absorber 1. As has been verified by experiments, in comparison with the articles produced of the wire spirals and the bunch set at random in the present chock-absorber, the coefficient of dynamic force for resonance is reduced by three times along with a five-fold increase in the static strength.

EXAMPLE 2

Figure 3:
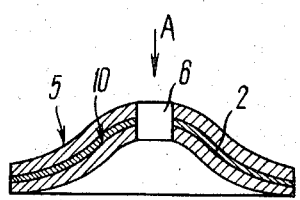
FIG. 3 is a diametrical sectional view of another embodiment comprising a bell-shaped element.
Figure 4:
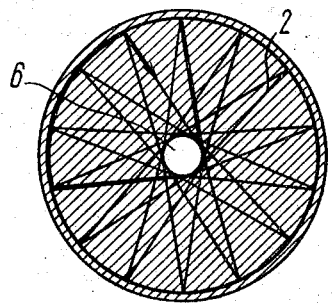
FIG. 4 is a top plan along arrow A of FIG. 3 without an upper wire spiral blank.
Figure 5:
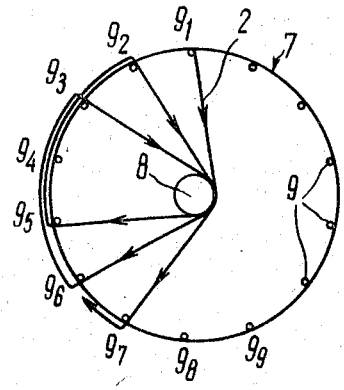
FIG. 5 is a flow diagram illustrating the laying-up of a bunch in turns in producing a bell-shaped article.

In manufacturing a bell-shaped shock-absorber 5 (FIGS. 3 and 4) provided with a central bore 6 for a fastener, an expanded wire spiral is wound in a ball by using any possible procedure and pressed slightly to obtain a cylindrical disc having uniform density both in thickness and over its area.

The disc produced is pierced at the center by a rod. Next, the disc together with the rod is set up in a fixture 7 which is a plate with a central bore for a rod 8 and pins 9 located at the periphery at equal radial distances from the rod.

The bunch can be laid in turns both on the surface of the wire spiral blank placed in the fixture 7 of directly on the fixture in whose bore the rod 8 is introduced.

In both cases, the bunch is set in turns approaching in shape an isosceles triangle so that each turn will encompass rod 8 and several pins 9 and each subsequent turn is displaced in relation to the preceding turn. Thus, one end of bunch 2 is secured on pin $9_1$ of fixture 7 whereupon bunch 2 is laid by applying a slight tension so that the first turn encompasses rod 8 and pins $9_5$, $9_4$, $9_3$ and $9_2$. The following turn is laid in a similar manner but with a slight displacement relative to the preceding turn encompassing rod 8 and pins $9_6$, $9_5$, $9_4$ and $9_3$, etc.

If bunch 2 is laid on the surface of the wire spiral blank, disposed on the fixture, on top of bunch 2 layer is placed one more blank made from the wire spirals. This is done by positioning it on rod 8 with the blank being produced in the same way as the previous one.

The assembly so produced thereof is removed from fixture 7 together with a guide of rod 8, wound with the wire spiral and pressed in a die to obtain an article of a requisite dimensions.

Where the wire spiral blank is produced in fixture 7, blank 10 (FIG. 3) on being stripped is placed between the blanks produced of the wire spirals to produce the article in the heretofore described manner.

In the finished article, the bunch turns are uniformly distributed throughout the area of the article in the space between hole 6 for a fastener and an edge of the article with each turn of bunch 2 approximating in shape an isosceles triangle (shown by a thickened line in FIG. 4) with radially positioned sides, a vertex encompassing the hole 6 for the fastener and the base located on the external edge of the article.

As it has been established in using the shock-absorbing articles the dynamic force factor for resonance is reduced by three times and the static strength raised by 27 times.

Figure 6:
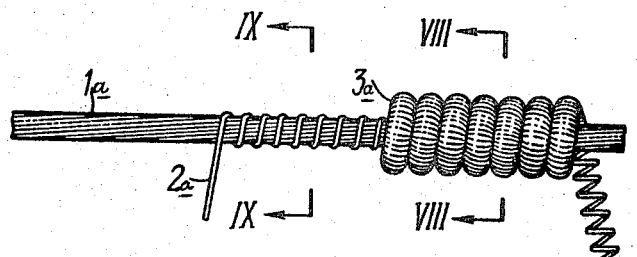
FIG. 6 illustrates a bunch wound with wire and a wire spiral.
Figure 7:
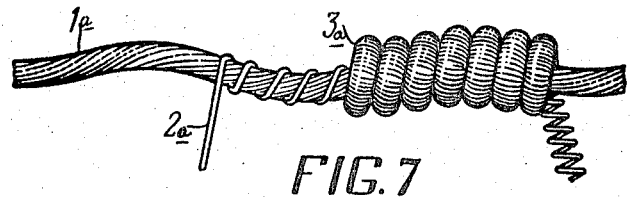
FIG. 7 illustrates a bunch in the form of a zigzag.
Figure 8:
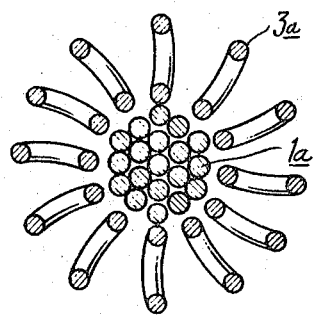
FIG. 8 is a view taken along the line VIII—VIII of FIG. 6, the view looking in the direction of the arrows and being on an enlarged scale.
Figure 9:
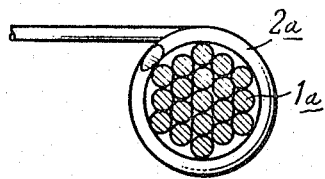
FIG. 9 is a view taken along the line IX—IX of FIG. 6, the view looking in the direction of the arrows and being on an enlarged scale.

As illustrated in FIG. 6, the bunch is a bundle of wires 1a wound with a wire 2a or a wire spiral 3a. To provide for high elasticity under various types of deformation, the bunch has the form of a zigzag as shown in FIG. 7. FIGS. 8 and 9 disclose, respectively, a bunch wound with a wire spiral and a wire.

In FIGS. 1–4, the shading illustrates a wire spiral stretched with a pitch approximately equal to the diameter of the spiral and laid in a uniform layer in a blank. The solid line diagrammatically depicts bunch wound with a wire spiral or wire.

For convenient manufacture and storage, the wire spiral is wound without any pitch, turn to turn.

What is claimed is:

1. A shock-absorbing article provided with means for receiving fasteners, wherein said means comprise wire spirals; a wire bunch defined by a bundle of wires and at least one wire wound about said bundle of wires; said spirals being pressed with said wire bunch; said wire spirals being laid uniformly in density both in thickness and over an article area; and said bunch being placed uniformly throughout the area of the article in turns with said turns of the bunch being displaced relative to each other and either of which encompasses in succession said fasteners.

2. The article as claimed in claim 1 in which the article is of ring-type, and the wire bunch is laid in the form of an Archimedean spiral.

3. The article as claimed in claim 1 in which the article is bell-shaped and provided with a central bore for receiving a fastener, the wire bunch turns being uniformly distributed throughout the article area in a space between the central bore and an external edge of the article; each wire bunch turn being laid approximating in shape an isoceles triangle, the sides of the triangle being located radially, a vertex encompassing the central bore and a base disposed along the external edge of the article.

4. A method for producing a ring-type article comprising forming a blank from wire spirals; laying a wire bunch defined by a bundle of wires and at least one wire wound about said bundle of wires along the blank surface; coiling said blank together with the wire bunch laid thereon; pressing said coiled blank and wire bunch in a die complementary in shape to the shape of the article being produced, by directing a pressing force along a coil axis and by laying the wire bunch during pressing in the form of an Archimedean spiral.

5. The method as claimed in claim 4 in which said at least one wire is a wire spiral.

6. The method as claimed in claim 4 in which said at least one wire has helical portions.

7. The method as claimed in claim 5 in which said bundle is preliminarily wound with a wire spiral by applying tension and with a pitch which is equal to a diameter of the wire spiral.

8. The method as claimed in claim 7 in which said bundle is preliminarily wound with a wire having helical portions with a second pitch amounting to 5–8 wire diameters.

9. The method as claimed in claim 5 in which a bunch upon being wound is laid in the form of a zigzag.

10. A method for producing a bell-shaped article provided with a central bore for receiving a fastener, comprising forming a first blank of wire spirals; forming a second blank of a wire bunch defined by a bundle of wires and at least one wire wound about said bundle of wires by laying the wire bunch in turns on a fixture having a centrally located rod and pins positioned at the periphery and spaced apart at one and the same distance from the rod so that each wire bunch turn encompasses the rod and several pins, with each subsequent turn being displaced in relation to the preceding turn whereby the turns approximate in shape an isosceles triangle whose sides are located radially, the vertex encompassing the rod and the base extending along an external edge of the article encompassing several pins; and forcing the first blank together with the second blank.

11. The method as claimed in claim 10 in which said at least one wire is a wire spiral.

12. The method as claimed in claim 10 in which said at least one wire has helical portions.

13. The method as claimed in claim 11 in which said bundle is preliminarily wound with a wire spiral by applying a requisite tension and with a pitch equalling a wire spiral diameter.

14. The method as claimed in claim 12 in which said bundle is preliminarily wound with a wire having helical portions with a pitch amounting to 5–8 wire diameters.

15. The method as claimed in claim 11 is which a bunch upon being wound is laid in the form of a zigzag.

* * * * *